United States Patent [19]
Jones et al.

[11] Patent Number: 4,895,137
[45] Date of Patent: Jan. 23, 1990

[54] BAFFLE ASSEMBLY FOR A HEAT EXCHANGER TUBE

[75] Inventors: Douglas S. Jones; Alfred E. Mullaney, Jr., both of Baltimore, Md.

[73] Assignee: Vulcan-Hart Corporation, Louisville, Ky.

[21] Appl. No.: 347,357

[22] Filed: May 4, 1989

[51] Int. Cl.$^4$ .............................. A47J 27/00
[52] U.S. Cl. .................. 126/391; 126/91 R; 138/38; 99/403; 165/109.1
[58] Field of Search .............. 126/91 R, 92 R, 91 A, 126/366, 369, 368, 375, 373, 391, 390; 431/347, 170, 355, 350, 326, 328; 122/135 T, 155 A, 155 C; 138/38; 165/109.1; 99/403, 407, 408

[56] References Cited
U.S. PATENT DOCUMENTS

| 2,702,539 | 2/1955 | Cayot | 126/91 R |
| 3,187,798 | 6/1965 | Pokorny | 431/328 |
| 3,509,867 | 5/1970 | Brosens et al. | 126/91 R |
| 3,769,959 | 11/1973 | Parker | 126/91 R |

FOREIGN PATENT DOCUMENTS 673172 1/1930 France .................. 126/91 R

Primary Examiner—James C. Yeung
Attorney, Agent, or Firm—Russell L. McIlwain

[57] ABSTRACT

A baffle assembly for a generally elongate heat exchanger tube of the type used in an atmospheric gas-fired heating appliance includes a perforated plate member formed in a V-shaped configuration and adapted to be secured within the heat exchanger tube in the path of combustion gases issuing from a heat exchanger. Ears formed integrally with the plate member engage the rearward end of the heat exchanger tube, and a rod extending forwardly of the plate member engages the forward end of the heat exchanger tube by means of a hook-shaped end portion formed thereon. The plate member is thereby secured within the heat exchanger tube such that combustion gases directed at the forward edge of the plate member are deflected outwardly against the side walls of the heat exchanger tube increasing the heat transfer rate thereto. Combustion gases passing through the perforations of the plate member also serve to heat the plate member to an infrared energy emitting condition whereby the walls of the heat exchanger tube are further heated by radiant energy. Thus, the baffle assembly provides for substantially enhanced heating efficiency of the appliance.

6 Claims, 3 Drawing Sheets

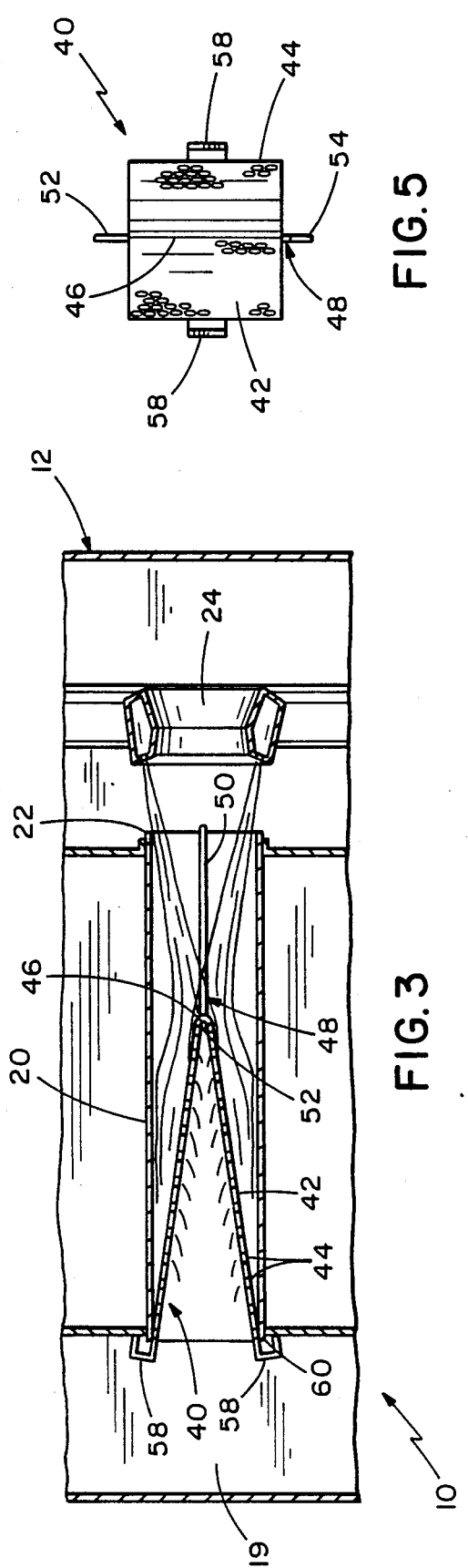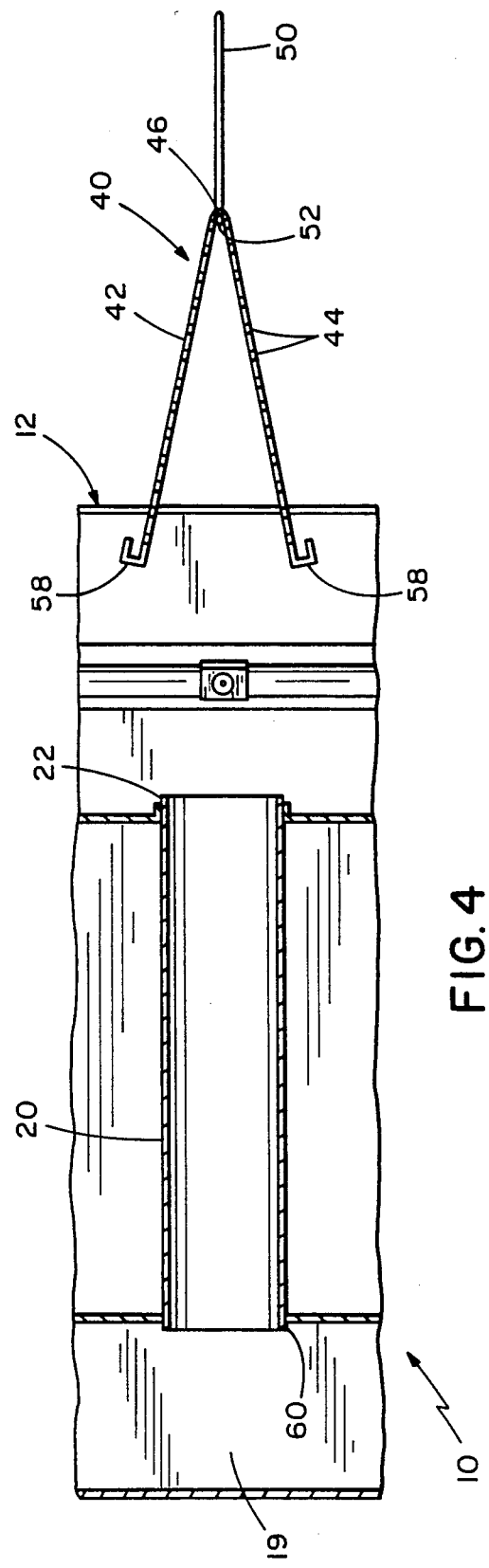

BAFFLE ASSEMBLY FOR A HEAT EXCHANGER TUBE

BACKGROUND OF THE INVENTION

1. Field of the Invention

The present invention relates to improvements in gas-fired heating appliances, and it relates more particularly to a new baffle assembly for insertion into the heat exchanger tube of a heating appliance to enhance the heating efficiency of the combustion gases passing through the heat exchanger tube.

2. Description of the Prior Art

Numerous heating appliances are available for consumer, commercial or industrial uses which rely on heating gas as an energy source. Many of these appliances include one or more burners connected to a regulated supply of heating gas and configured to direct combustion by-products into associated heat exchanger tubes. The combustion by-products flow through the heat exchanger tubes transferring heat to the walls thereof and are discharged to a flue box or otherwise exhausted to the environment. The heat which is transferred to the heat exchanger tubes may thereby be transferred to various media such as air or liquids of some type surrounding the exterior of the heat exchanger tubes.

One such heating appliance which has achieved success in recent times is the atmospheric, gas-fired, commercial deep fat fryer. Gas-fired deep fat fryers are used in numerous commercial and institutional cooking establishments to prepare fried foods of various kinds. Typically, such an appliance includes a vat for containing a relatively large quantity of cooking oil. The cooking oil may be advantageously heated by immersed heat exchanger tubes extending through the vat at preselected locations.

A disadvantage of known atmospheric gas-fired fryers is that they operate at relatively low energy efficiency. This is necessarily the result of atmospheric burning conditions which require the heat exchanger tubes to exhaust combustion by-products before the entire heating value of the by-products has been fully expended or transferred through the walls of the heat exchanger tubes to the media which is to absorb the heat input. Accordingly, it would be desirable to provide a gas-fired heating appliance which exhibits substantially enhanced thermal efficiency through economically manufacturable means.

SUMMARY OF THE INVENTION

Briefly, there is provided in accordance with the teachings of the present invention a new baffle assembly for insertion into a heat exchanger tube of a heating appliance. The baffle assembly comprises a perforated plate formed into a generally V-shaped configuration defining a forward edge, a lower edge and an upper edge. A pair of ears formed integrally with the plate engage the rearward end of the heat exchanger tube and a forwardly extending rod having a hooked end portion engages the forward end of the heat exchanger tube thereby providing means for retaining the baffle assembly within the tube. The rod is so formed as to space the perforated plate away from the upper and lower wall portions of the heat exchanger tube whereby combustion gases directed into the heat exchanger tube can partially by-pass the perforated plate and proper combustion efficiency can be achieved. Moreover, gases directed at the forward edge of the plate are partially directed outwardly toward the walls of the heat exchanger tube whereby heat transfer to the heat exchanger tube walls is enhanced. In addition, the combustion gases passing through the perforations cause the plate to radiate infra-red energy toward the sidewalls of the heat exchanger tube. The baffle assembly of the instant invention is, therefore, capable of substantially increasing the heating efficiency of the combustion gases flowing through the heat exchanger tube.

BRIEF DESCRIPTION OF THE DRAWINGS

The foregoing and other novel features of the present invention will be better understood by a reading of the following detailed description taken in connection with the accompanying drawings wherein:

FIG. 3 is a fragmentary sectional view illustrating one of the heat exchanger tubes and baffle assemblies shown in FIG. 1;

FIG. 4 is a fragmentary sectional view illustrating a heat exchanger tube having the instant baffle assembly withdrawn therefrom; and FIG. 5 is front elevational view of a baffle assembly constructed in accordance with the principles of the instant invention.

DETAILED DESCRIPTION OF THE PREFERRED EMBODIMENTS

Figure 1:
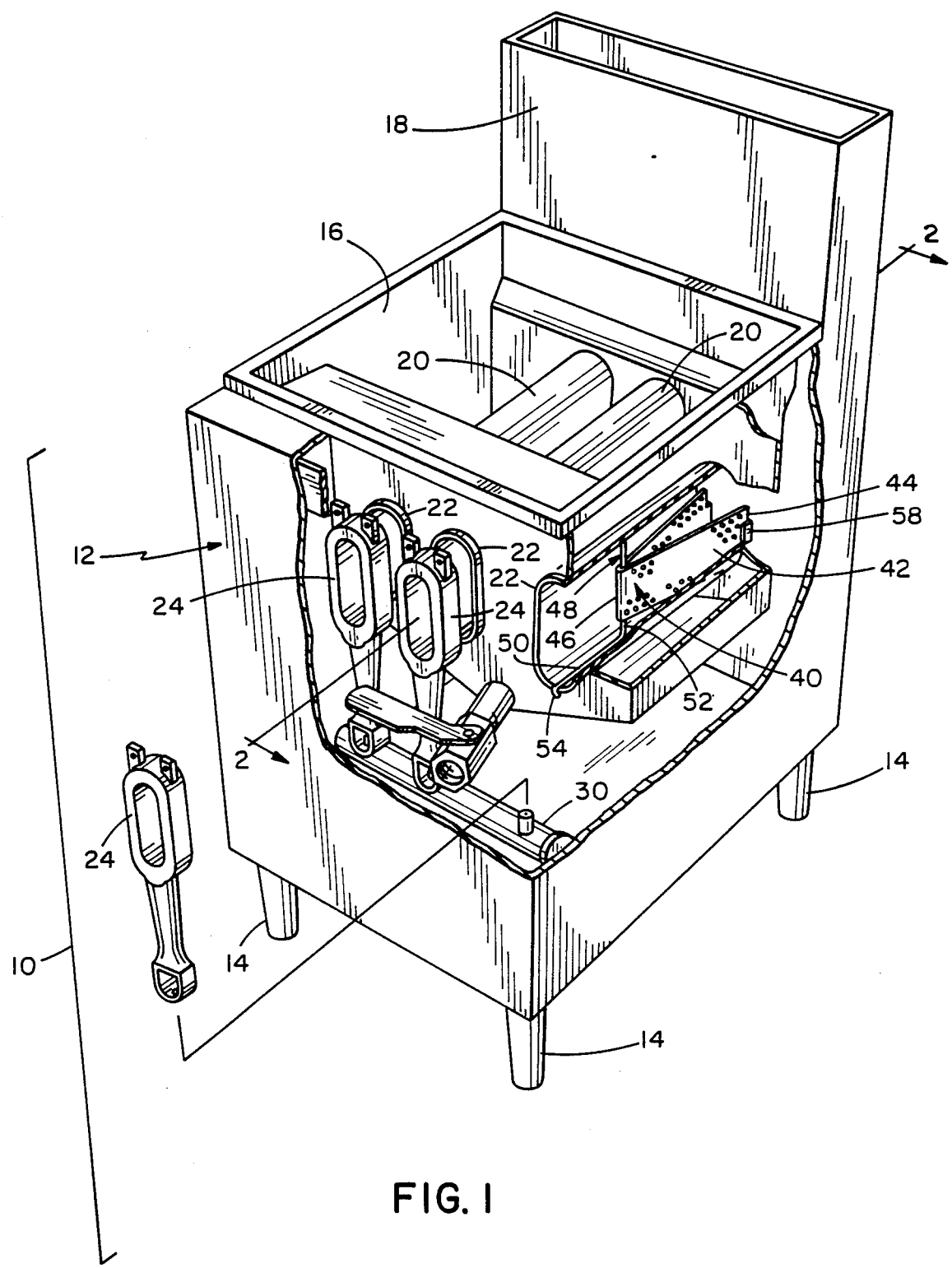
FIG. 1 is an exploded perspective view of a heating appliance, partially broken away, illustrating use of a baffle assembly constructed in accordance with the principles of the invention.
Figure 2:
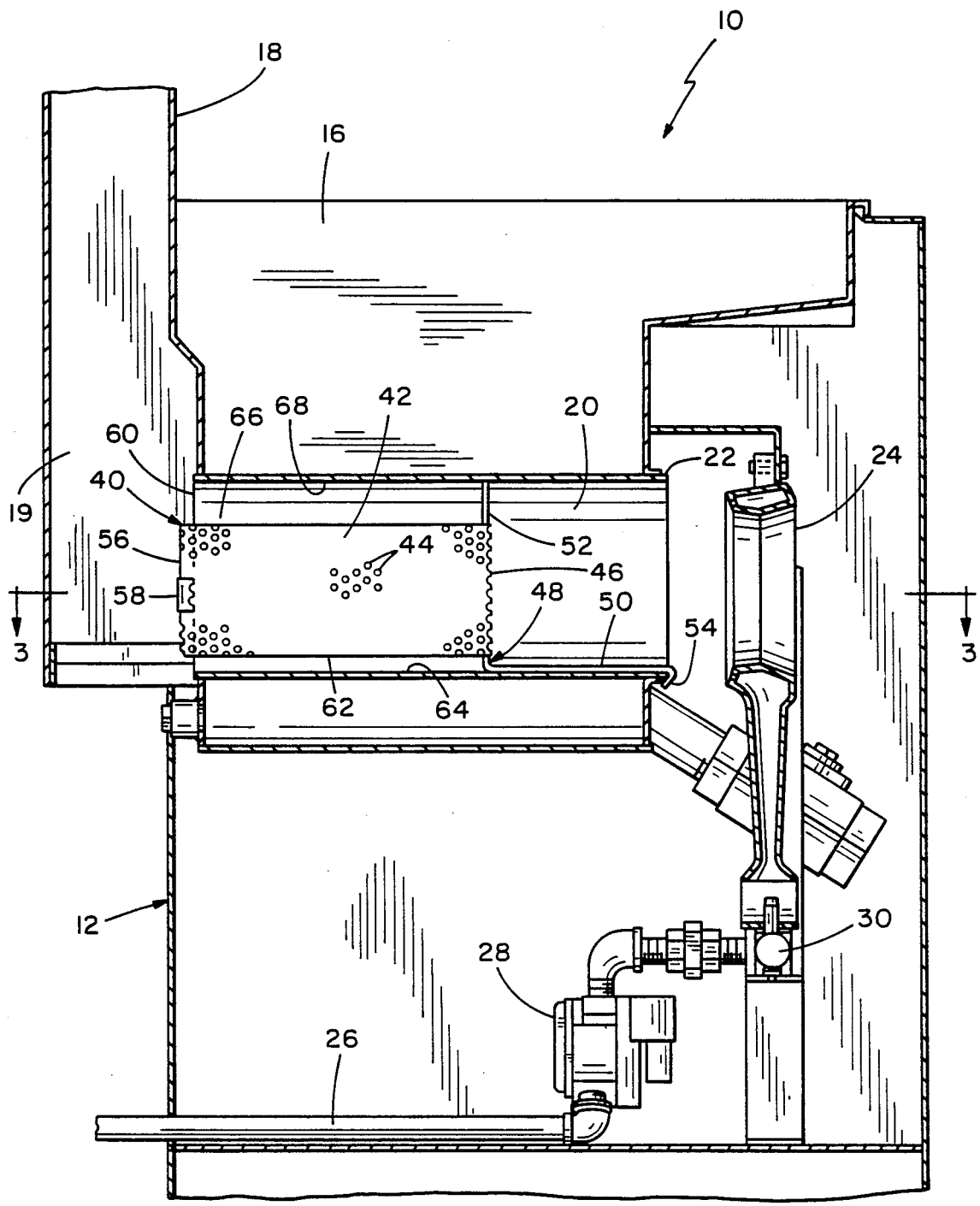
FIG. 2 is a sectional view taken along the line 2—2 of FIG. 1.

Referring now to the drawings, and initially to FIGS. 1 and 2, a typical atmospheric, gas-fired heating appliance, designated generally by the reference numeral 10, is illustrated in the form of a commercial deep fat fryer. It should be understood that the illustrated fryer 10 is only one example of an appliance which can practice the teachings of the invention and, therefore, the invention is not intended to be limited to fryers alone. For example, many appliances, such as an atmospheric gas-fired furnace, a hot water heater or an oven can equally practice the invention. The fryer 10 includes as its principal components a cabinet assembly 12, supported on suitable legs 14, into which a vat 16 is fitted. The rear of the cabinet 12 defines a flue 18 together with an integral flue box 19, and a plurality of heat exchanger tubes 20 extend through the vat 16 in communication with the flue box 19. The heat exchanger tubes 20 are hollow, generally elongate members having oval cross-sections. At forward ends 22 of the heat exchanger tubes 20, a plurality of burners 24 are mounted to the cabinet assembly 12 spaced from the heat exchanger tubes 20 such that the ignited gas issuing from the burners 24 can be drawn into the heat exchanger tubes 20 along with ambient air. The burners 24 are furnished with a gas mixture from a suitable supply line 26 connected to a low pressure regulator 28 and manifold 30. In accordance with the invention, a baffle assembly 40 is mounted within each of the heat exchanger tubes 20.

Turning now to FIGS. 3 and 5, the baffle assembly 40 can be seen to include a plate member 42 having perforations 44 formed therein and bent or folded to a generally V-shaped configuration. The folding of the plate member 42 defines a forward edge, designated generally by the reference numeral 46. The baffle assembly 40 further includes a rod member 48 having a forward extension portion 50 and a vertical extension portion 52. As best seen in FIG. 2, the forward extension portion 50 of the rod member 48 includes a hook-shaped terminus 54 for engaging the forward ends 22 of the heat exchanger tubes 20, thereby serving to retain the baffle assemblies 40 within the heat exchanger tubes 20. The vertical extension portion 52 of the rod member 48 is secured behind the fold at the forward edge 46 of the plate member 42 as by welding or a clip arrangement, for example. Rearward edges 56 of the plate member 42 may be formed with integral ears 58 for engaging rearward ends 60 of the heat exchanger tubes 20, serving further to support the baffle assemblies 40 within the heat exchanger tubes 20.

As best seen in FIG. 2, the height of the plate member 42 is preferably sized as to be less than the height of the vertical extension portion 50 of the rod member 48, and the plate member 42 is secured to the vertical extension portion 50 approximately centrally thereof. By this configuration, lower edges 62 of the plate members 42 are spaced from bottom wall portions 64 of the heat exchanger tubes 20, and likewise, upper edges 66 of the plate members 42 are spaced from upper wall portions 68 of the heat exchanger tubes 20, for purposes which will be explained in detail, hereinafter. In FIG. 4, the baffle assembly 40 can be seen as withdrawn from a heat exchanger tube 20 in a naturally expanded state Such expansion ensures that as the plate member 42 is compressed when received within the heat exchanger tube 20, the natural spring bias of the plate member 42 will cause the ears 58 of the rearward plate edges 56 to immovably engage the rearward ends 60 of the heat exchanger tubes 20.

Operation

It can be appreciated that when the instant baffle assembly 40 is installed within a heat exchanger tube 20, combustion gases directed at the forward edge 46 of the plate member 42 are partially deflected outwardly of the plate member 42 against the side walls of the heat exchanger tube 20, as best seen in FIG. 3. This impingement of gases on the heat exchanger tube 20 walls enhances the rate of heat transfer between the combustion gases and heat exchanger tube 20, as compared to an unbaffled arrangement wherein the gases flow, in large part, unrestricted through the center of the heat exchanger tube 20. Moreover, a portion of the gas stream passes through the perforations 44 of the plate member 42 causing the plate member 42 to be heated such that it emits infra-red radiation in the direction of the side walls of the heat exchanger tube 20. The walls of the heat exchanger tube 20 are thereby subjected to additional heating which may be further enhanced by coating the interior walls with a heat absorptive material, such as high temperature black oxide paint. A further aspect of the invention resides in the spacing of the upper and lower edges, 66 and 64 respectively, of the plate member 42 from the upper and lower wall portions, 68 and 64 respectively, of the heat exchanger tube 20. This spacing permits a portion of the combustion gases to pass unrestricted through the heat exchanger tube 20 so that proper draw of the heated gases through the heat exchanger tube 20 and flue box 19 can be achieved. Adjustment of the aforementioned spacing can readily be performed by sizing the height of the plate member 42 in relation to the size of the flue box 19 to achieve an optimum fuel to air ratio within the heat exchanger tube 20.

In practice, an atmospheric gas-fired fryer 10, as illustrated and without baffle assemblies 40, has an energy efficiency of on the order of 43 percent or less, as determined by a standard steady state water boil-off test procedure. However, with the use of the instant baffle assembly 40 an efficiency on the order of 50 percent or greater has been observed. To accomplish this enhanced efficiency, the plate member 42 is preferably constructed as to be approximately 40 percent open, with perforations 44 within a range of 3/16 inch to 5/16 inch in diameter and concentrated on the order of 4 to 8 per square inch. This configuration of perforations 44 ensures that adequate draw through the heat exchanger tube 20 will be achieved using a standard sized flue box 19 as is found in conventional commercial deep fat fryers now in use. Also, the plate member 42 may advantageously be constructed of a low oxidizing material such as 406 A II stainless steel to have considerable service life under the extreme temperature conditions present within the heat exchanger tube 20. Thus, the baffle assembly 40 of the instant invention may be readily manufactured without expensive assembly operations and at relatively low cost.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

We claim:

1. A baffle assembly for a burner tube of the type comprising a hollow, generally elongate heat transfer member, said baffle assembly comprising a perforated plate member formed into a generally V-shaped configuration defining a forward edge, and ears integrally formed on said plate member and adapted to engage an end of said burner tube for retaining the baffle assembly within the burner tube, whereby combustion gases directed at said forward edge are partially deflected to the walls of the burner tube for enhanced heat transfer between the combustion gases and the burner tube.

2. The baffle assembly of claim 1 wherein said plate member comprises a lower edge and said baffle assembly further includes means for spacing said lower edge from the wall of said heat exchanger tube.

3. The baffle assembly of claim 1 wherein said plate member comprises an upper edge and said baffle assembly further includes means for spacing said lower edge from the wall of said heat exchanger tube.

4. The baffle assembly of claim 1 wherein the perforations of said plate member have a size within the range of 3/16 inch to 5/16 inch in diameter.

5. The baffle assembly of claim 1 wherein the perforations of said plate member have a concentration on the order of 4 to 8 per square inch.

6. A baffle assembly for a burner tube of the type comprising a hollow, generally elongate heat transfer member, said baffle assembly comprising a perforated plate member formed into a generally V-shaped configuration defining a forward edge, and a rod having a hooked end portion for engaging an end of said burner tube, whereby combustion gases directed at said forward edge are partially deflected to the walls of the burner tube for enhanced heat transfer between the combustion gases and the burner tube.

* * * * *